March 1, 1932.  H. MILLER  1,847,620

PRESS

Filed Sept. 29, 1930

INVENTOR.
Henry Miller

BY Edwin A. Andrus

ATTORNEY.

Patented Mar. 1, 1932

1,847,620

UNITED STATES PATENT OFFICE

HENRY MILLER, OF MILWAUKEE, WISCONSIN, ASSIGNOR TO A. O. SMITH CORPORATION, OF MILWAUKEE, WISCONSIN, A CORPORATION OF NEW YORK

PRESS

Application filed September 29, 1930. Serial No. 485,337.

The present invention relates to an improvement in presses.

The object of the invention is to provide a method of and an expedient to release a press jammed on dead center.

The invention will be more clearly understood by referring to the accompanying drawings in which.

Figure 1:
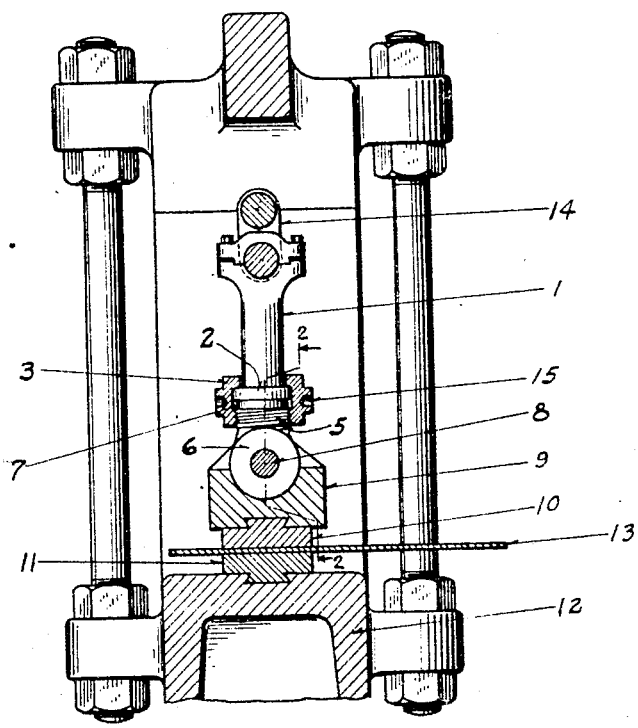
Figure 1 is a vertical sectional view of a press embodying the invention.
Figure 2:
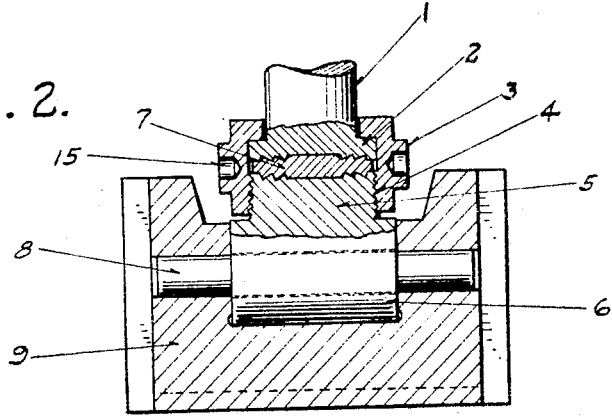
Fig. 2 is a vertical sectional view of the release mechanism, taken on the line 2—2 of Fig. 1.
Figure 3:
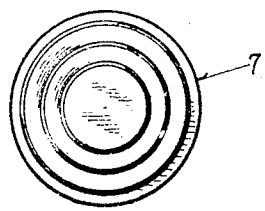
Fig. 3 is a top view of the fusible metallic washer.

In carrying out the invention, the pitman 1 is provided with a flange 2 near its lower extremity. A suitable nut 3, surrounding said pitman and abutting the flange 2, is provided with a threaded opening 4. The threads of the opening are adapted to engage the threaded shank 5 of the lower eye 6 of the pitman.

A fusible metallic washer 7 is interposed between the flange 2 and the threaded shank 5. The washer 7 is preferably of a metal which fuses or melts at a relatively low temperature, so that its removal may be accomplished without overheating the surrounding parts. The lower eye 6 of the pitman 1 is journalled to a suitable wrist pin 8 running through the ram 9.

The upper die 10 is dove-tailed or otherwise suitably secured to the ram 9. The lower die 11 is mounted upon a suitable support 12.

The work piece 13 is placed between the dies 10 and 11 when the press is operated.

If an accidental failure of power causes the press to jam on dead center, the nut 3 is unscrewed to expose the fusible metallic washer 7.

The washer 7 is then cut or melted out with a torch or other suitable means and the pitman released so that the crank 14 may be turned, the work 13 removed, and the press prepared for further use.

To condition the press again, another fusible washer is inserted between the flange 2 and the projection 5 and the nut 3 is screwed down over the washer.

The surfaces of the flange 2 and the projection 5 may be concentrically corrugated to receive corresponding ribs on the fusible washer 7 to counter-act the tendency of the washer to spread and flatten because of pressure exerted thereon by the press in operation.

Openings 15 may be provided in the nut 3 for the engagement of special wrenches for turning the nut on and off the threaded projection 5.

The release of the press and replacement of the washer 7 may be accomplished in a relatively short time.

While the preferred embodiment has been described, it will be understood that the washer may be placed at any advantageous position such as under a die or at the tie rods.

I claim:

1. In combination with a pitman formed of two parts, a coupling adapted to connect said parts of the pitman together, and a fusible metallic washer interposed between said parts and enclosed by said coupling.

2. In combination with a press pitman, a fusible metallic washer disposed intermediate the opposite ends of the pitman, and means for holding said washer in position during operation of the press.

3. In a power press, in combination, press members for performing pressing operations, a fusible link connected for transmitting an actuating force to the press members, said link being disposed in an accessible position to facilitate its removal by fusion to release the press members.

4. In a power press, a pitman formed of two parts, a coupling adapted to connect said parts of the pitman, and a metallic washer adapted to fuse at a temperature relatively lower than the parts of the pitman, interposed between said parts and enclosed by said coupling.

In witness whereof, I have signed my name at Milwauke, Wisconsin, this 18th day of September, 1930.

HENRY MILLER.